Feb. 9, 1960

W. S. ROUVEROL 2,924,411

COUNTERBALANCING MECHANISM

Filed May 19, 1955

6 Sheets-Sheet 1

INVENTOR.

WILLIAM S. ROUVEROL

BY

David D. McKenney

ATTORNEY

Feb. 9, 1960 W. S. ROUVEROL 2,924,411

COUNTERBALANCING MECHANISM

Filed May 19, 1955 6 Sheets-Sheet 2

INVENTOR.
WILLIAM S. ROUVEROL
BY David D. McKenney
ATTORNEY

COUNTERBALANCING MECHANISM

Filed May 19, 1955

INVENTOR.
WILLIAM S. ROUVEROL
BY David D. McKenney
ATTORNEY

INVENTOR.
WILLIAM S. ROUVEROL
BY
David D. McKenney
ATTORNEY

INVENTOR.
WILLIAM S. ROUVEROL
BY
David D. McKenney
ATTORNEY

Feb. 9, 1960 W. S. ROUVEROL 2,924,411

COUNTERBALANCING MECHANISM

Filed May 19, 1955 6 Sheets-Sheet 6

INVENTOR.
WILLIAM S. ROUVEROL
BY David D. McKenney
ATTORNEY

United States Patent Office 2,924,411

Patented Feb. 9, 1960

2,924,411

COUNTERBALANCING MECHANISM

William S. Rouverol, Berkeley, Calif., assignor to Grinnell Corporation, Providence, R.I., a corporation of Delaware Application May 19, 1955, Serial No. 509,551

17 Claims. (Cl. 248—54)

This invention relates to counterbalancing mechanisms and more particularly has to do with spring hangers for exerting a constant supporting force on the weight of fluid handling equipment which is subject to vertical movement caused by changes in the temperature of the fluid.

The support of the weight of equipment designed to carry fluids which change in temperature, for example power plant piping systems carrying steam from boiler to turbine, has constituted a serious problem because the changes in fluid temperature result in expansion and contraction of the piping. The weight of such piping, the fluid therein and the insulation thereon must be supported because any unsupported weight will produce dangerous stresses in the piping or its connections. At the same time, however, the piping must be allowed to expand and contract freely with changes in temperature because restraint of such movement will likewise produce dangerous stresses.

In general the sections or "runs" of pipe in a piping system of the kind under consideration are disposed in either horizontal or vertical positions. If all sections in a system could be horizontal expansion and contraction of such sections would present no particular problem because the resulting movement would all be horizontal while pipe section weight would, of course, be acting vertically downward. Expansion joints with rollers or long rods from an overhead fixed structure would be sufficient to provide proper support and at the same time accommodate such horizontal movements. However, the necessity in almost every system for vertical sections connected to the horizontal run results in vertical movement of the major portions of both these vertical sections and the horizontal sections extending from them. Constant support pipe hangers are devices which are interposed between some fixed structure and the vertically movable pipe sections at selected points therealong and which exert on such sections a weight-supporting force which remains constant as the piping moves up and down.

The present invention provides a mechanism which will exert on a body subject to substantially straight-line movement within a limited range a force along such line which is constant for any position of the body within the range. In the adaptation of this mechanism to a constant support pipe hanger the parts are arranged so that this force is exerted vertically upward, but as the description progresses it will be understood that any line of action may be selected.

In one of its forms the mechanism contemplated by the present invention comprises a fixed frame having a lever pivoted thereon about an axis perpendicular to the line of action along which the constant force is to be exerted. A spring is secured to the frame and to a point on the lever spaced from the axis thereof so that rotation of the lever in one direction deforms the spring and causes it to exert a turning moment on the lever which opposes such rotation and varies linearly with changes thereof. The body on which the constant force is to be exerted is also connected to the lever at a point spaced from the lever pivot but in such a way that the turning moment exerted by the body on the lever tends to rotate the same in the spring deforming direction and also varies linearly with changes in lever rotation. More particularly the spring contemplated is of that type which has a substantially constant change in force per unit of deformation, and this spring is connected to the lever so that the line of action of the spring force remains at a constant perpendicular distance from the lever axis during changes in lever rotation. In addition the connection contemplated between the body and the lever involves a flexible member wrapped onto a lever edge portion which follows the curve of an involute generated from a circle centered at the lever axis. The flexible member extends tangentially from this edge portion to the body in substantially the same direction for all rotative positions of the lever within the range of the mechanism.

One object of the present invention is to provide a counterbalancing mechanism for exerting a substantially constant force on body movable within a limited range, wherein the constancy of support is as good as that achieved in prior devices and wherein the arrangement of parts is more simple and compact and less expensive than in such prior devices.

Another object of the invention is to provide a counterbalancing mechanism of the character described having a frame, a lever pivoted thereon and a spring connected between the frame and lever, wherein it is not required that the spring be pivoted to either the frame or the lever.

Another object of the invention is to provide a counterbalancing mechanism of the character described, wherein the spring is deflected by rotation of the lever about the lever pivot and exerts a turning force on the lever at a distance from the pivot which remains constant for all rotative lever positions within the mechanism's range.

Another object of the invention is to provide a mechanism of the character described, wherein the lever has an edge portion following the curve of an involute generated from a circle centered at the lever pivot, wherein a flexible member secured to the lever and wrapped against the involute edge thereof extends substantially tangentially therefrom to the body for connection therewith, and wherein the flexible member so extends to the body in substantially the same direction for all rotative positions of the lever so that the perpendicular distance from the lever pivot to the extending flexible member varies linearly for all rotative lever positions within the mechanism's range.

Another object of the invention is to provide a mechanism of the character described wherein the spring rate or change in force per unit deformation of the spring may be varied.

Another object is to provide a mechanism of the character described wherein the deflection of the spring for a given lever position may be varied.

Another object is to provide a mechanism of the character described wherein the spring is a spiral spring.

Another object is to provide such a mechanism wherein the spring is a helical extension spring.

Another object is to provide such a mechanism wherein the spring is a helical compression spring.

Another object is to provide a mechanism of the character described wherein two involute-edged levers are employed, wherein each lever has a spring connected thereto and the levers are thereby urged to rotate in opposite directions, and wherein the levers have flexible members connected thereto with aligned portions extending substantially tangentially therefrom in opposite directions, one such portion adapted for connection with a fixed structure and the other portion adapted for connection with the body.

Another object of the invention is to provide mechanism of the character described wherein the frame is disposed with the axis of each lever horizontal and the extending portion of the flexible member connected to the body vertical, and wherein the body is fluid handling equipment subject to limited vertical movement caused by changes of the temperature therein.

Other objects and features or advantages of the invention will be appreciated as the description herein develops.

The best modes in which it has been contemplated applying the principles of the present invention are shown in the accompanying drawings but the latter are to be deemed merely illustrative because it is intended that the patent shall cover by suitable expression in the appended claims whatever features of patentable novelty exists in the invention disclosed.

Figures 1, 2:
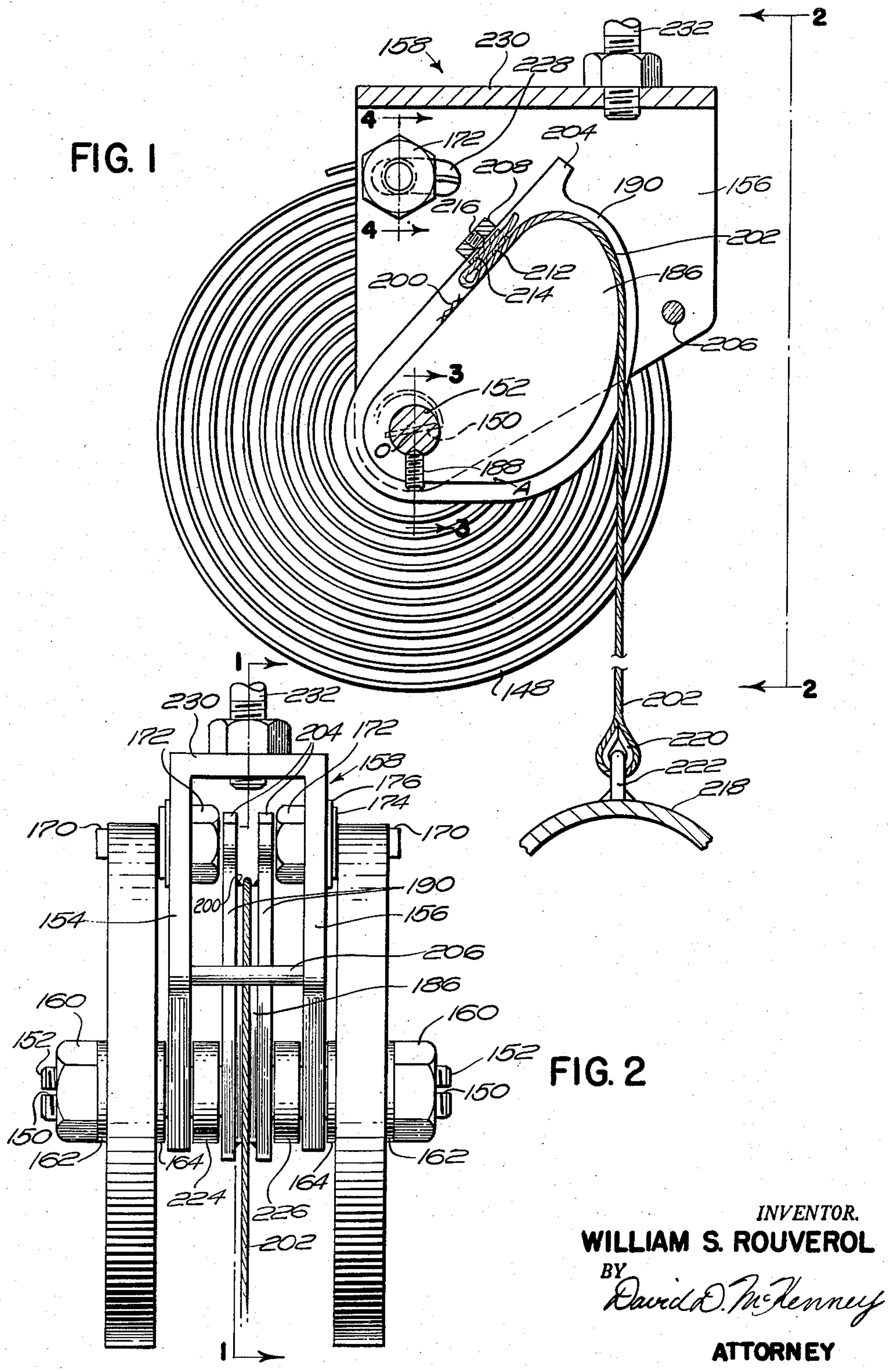
Figure 1 is a side elevation view of a counterbalance mechanism in the form of a spiral spring pipe hanger, the view being taken on line 1—1 of Fig. 2.
Figure 2 is an end elevation view of the hanger of Fig. 1 unsectioned, this view being taken on line 2—2 of Fig. 1.
Figures 3, 5:
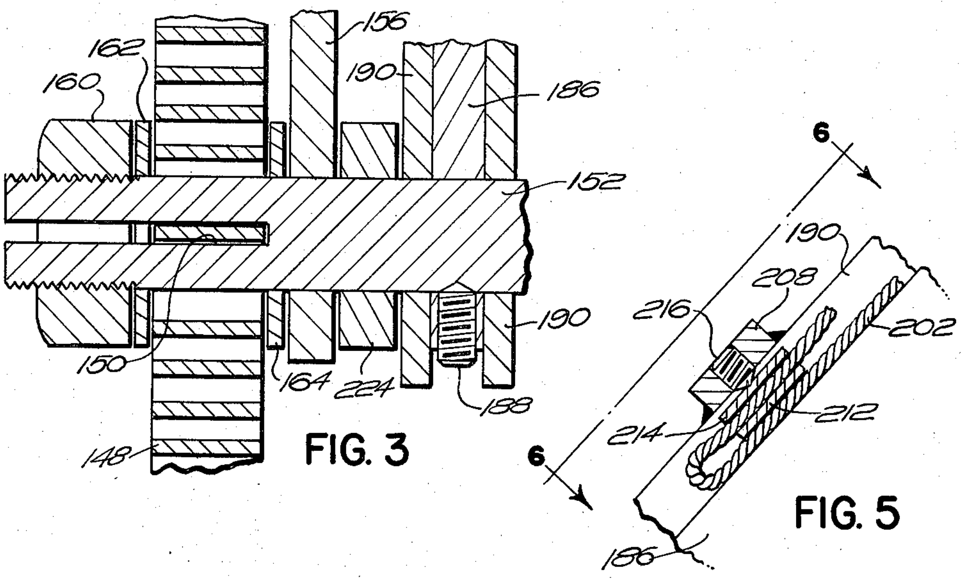
Figure 3 is a cross-sectioned end elevation view of the attachment of pivot to the frame, to the lever and to the spring and is taken on line 3—3 of Fig. 1.
Figure 4:
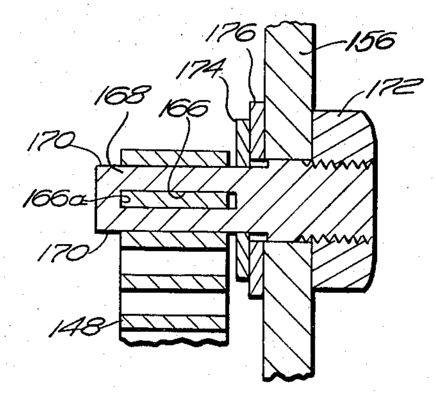
Figure 4 is a cross-sectioned end elevation view of the attachment of the spring to the frame taken on line 4—4 of Fig. 1.
Figure 6:
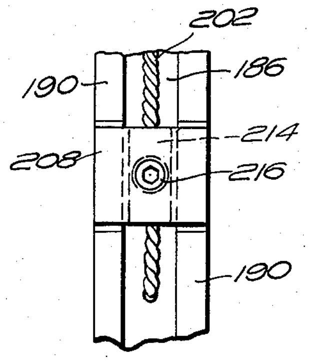
Figure 4A:
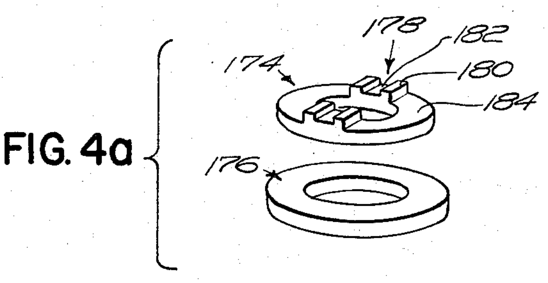
Figure 7:
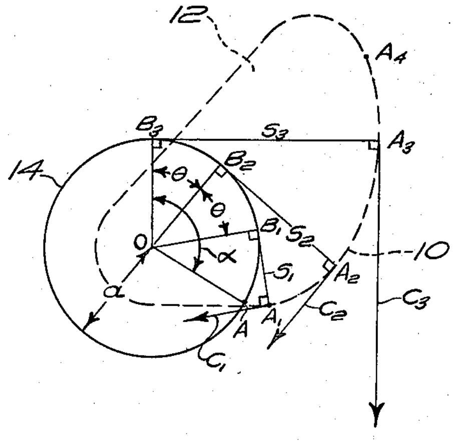
Figures 8, 9, 10:
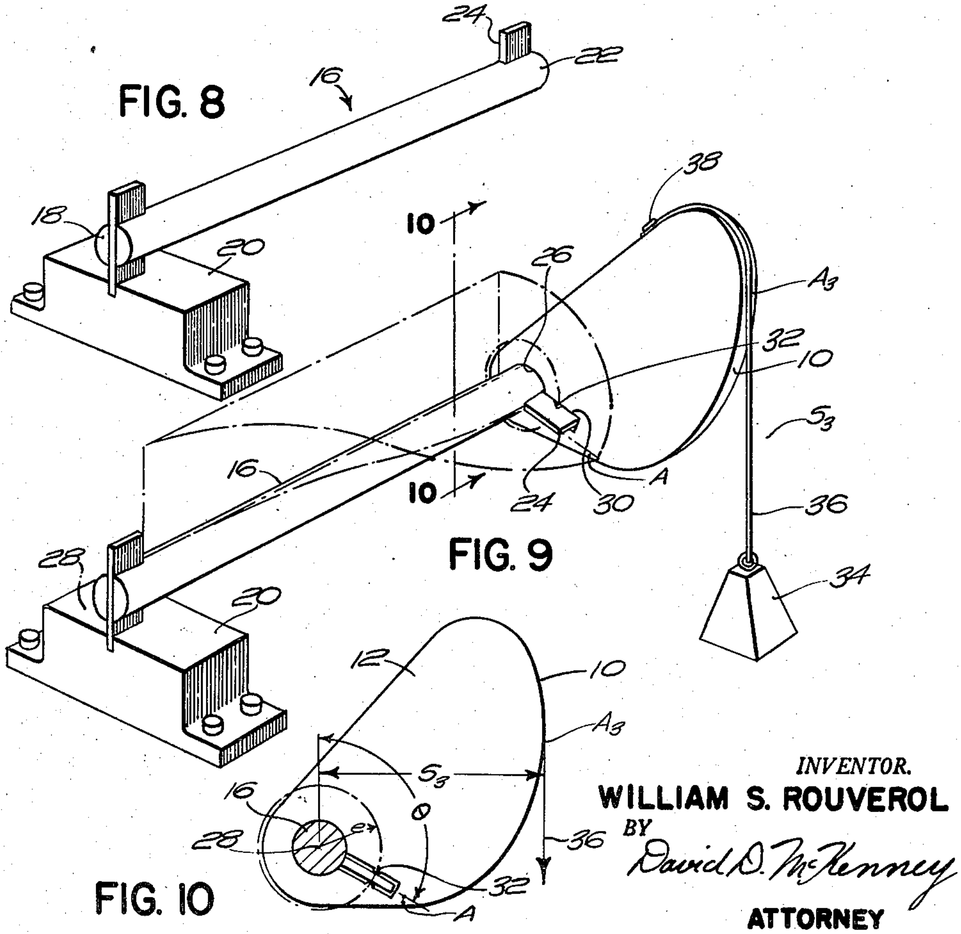
Figures 11, 12:
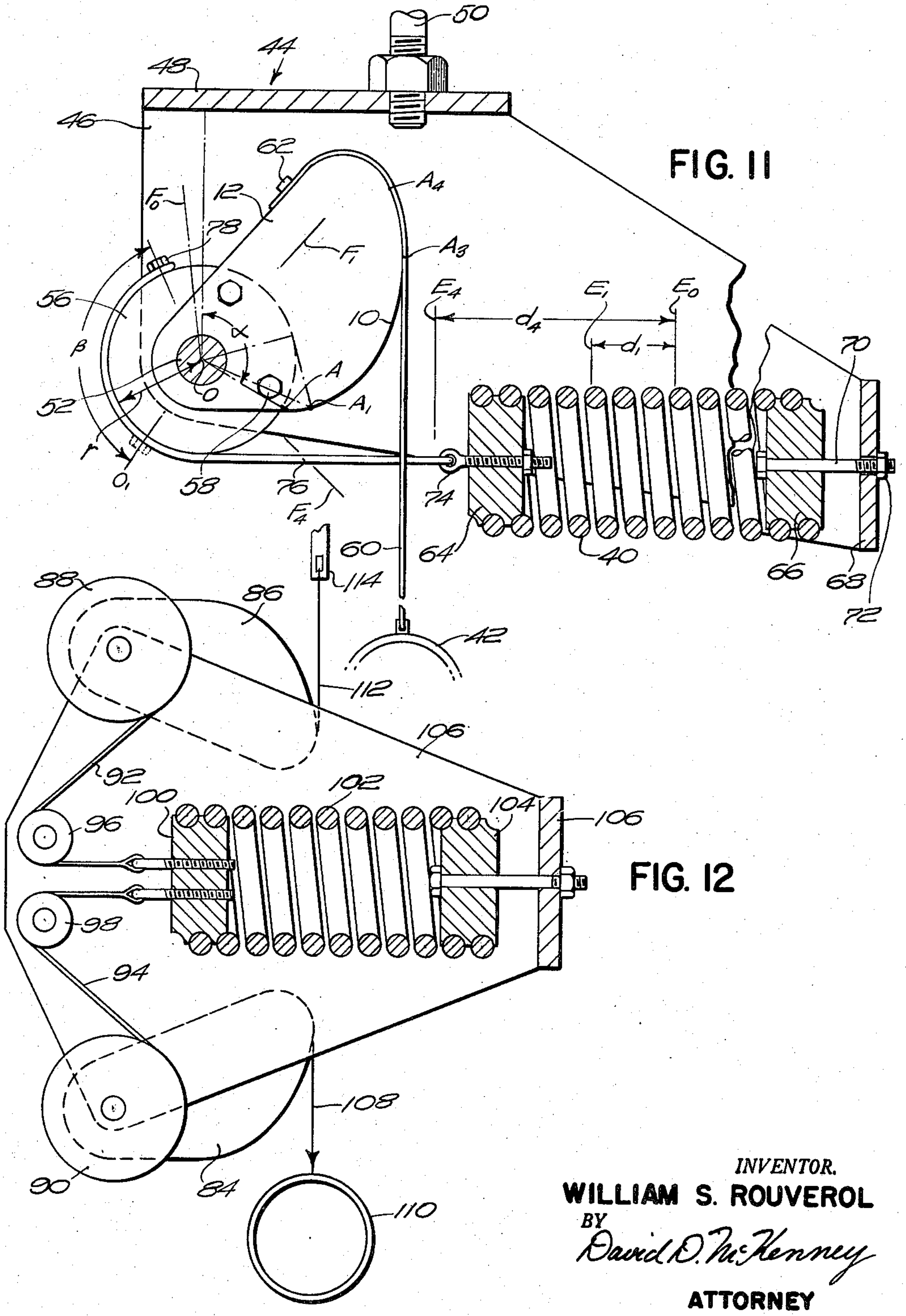
Figure 13:
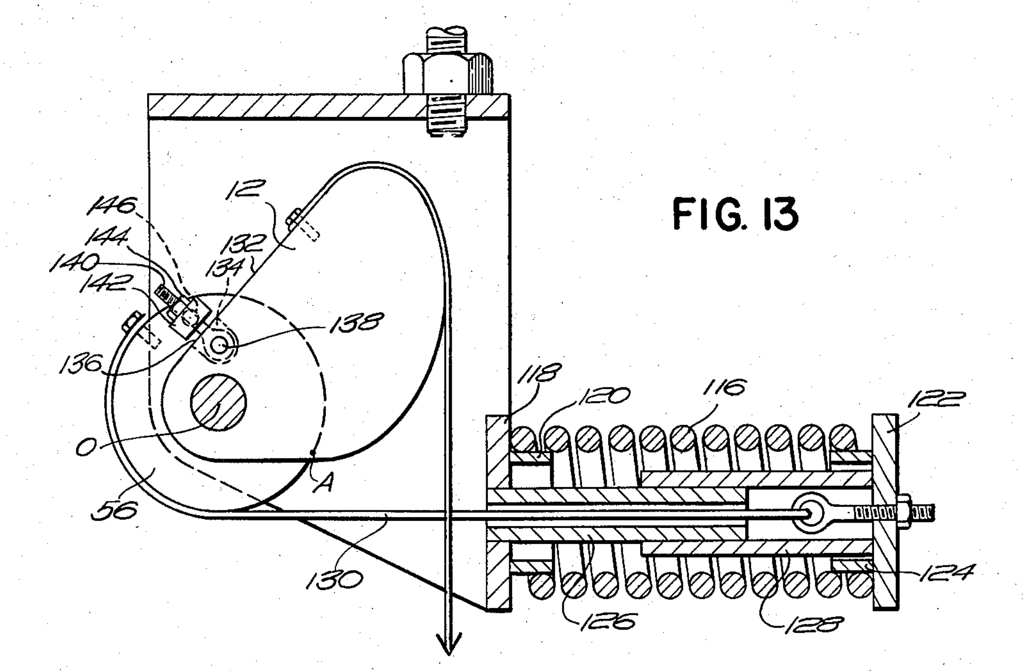
Figure 14:
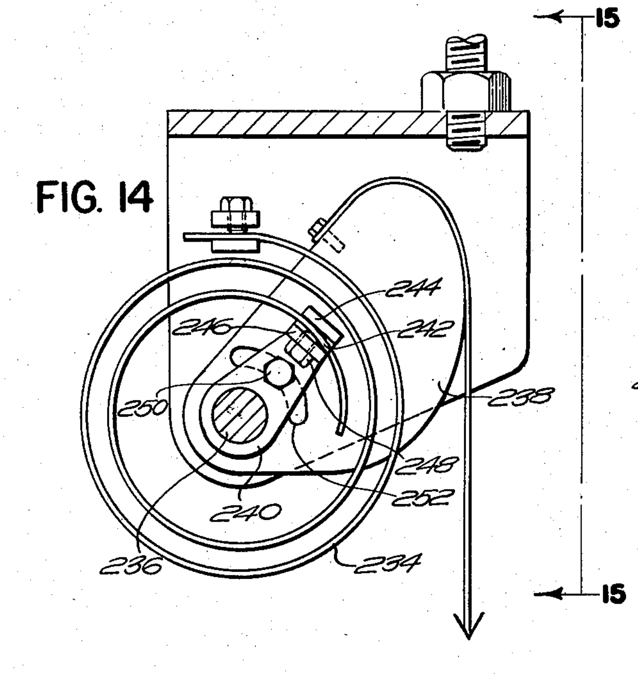
Figure 15:
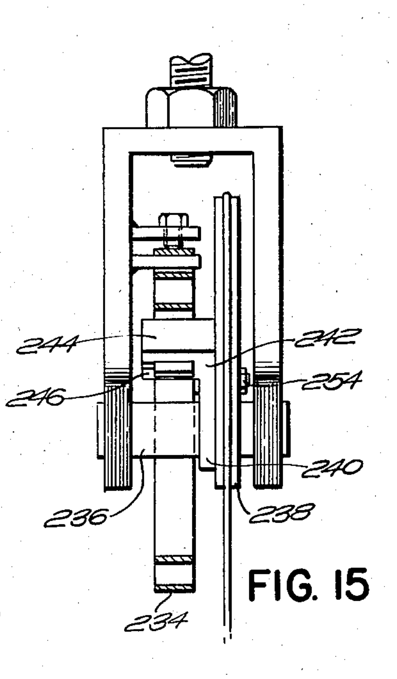
Figure 16:
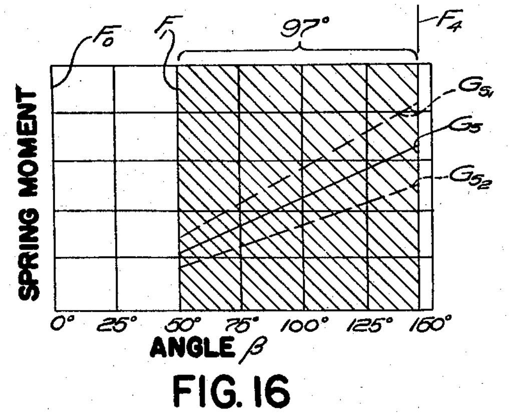
Figure 17:
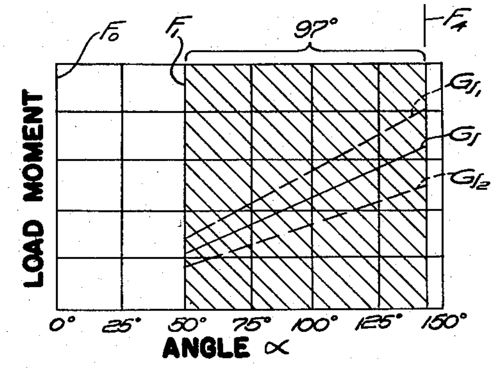
Figures 18, 19:
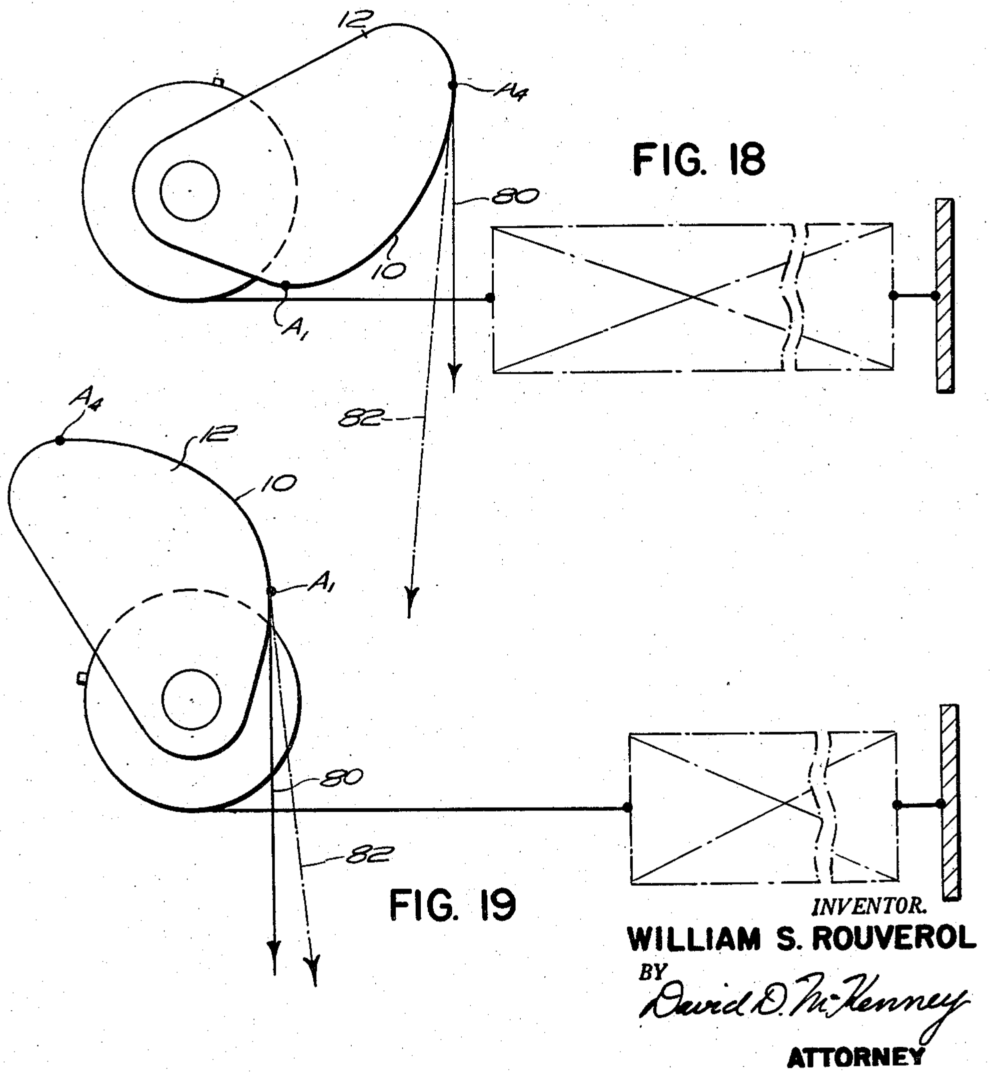

Figure 4*a* is a perspective view of one of the washers employed in the attachment shown in Fig. 4;

Figure 5 is an enlarged fragmentary side elevation view of the attachment of the flexible member to the lever in Fig. 1;

Figure 6 is a view taken on line 6—6 of Fig. 5;

Figure 7 is a diagrammatic view of the lever employed in Fig. 1 showing how the involute-shaped lever edge is generated;

Figure 8 is a perspective view of one form of an undeformed spring secured to a frame at one end and adapted to be secured to the lever at the other end;

Figure 9 is a perspective view of the spring of Fig. 8 secured to the lever and deformed by rotation thereof;

Figure 10 is a view taken on line 10—10 of Fig. 9;

Figure 11 is a cross-sectioned side elevation view of a counterbalancing mechanism employing a helical tension spring;

Figure 12 is a cross-sectioned side elevation view of a counterbalancing mechanism employing two involute armed levers whereby the line of action of the force exerted remains fixed;

Figure 13 is a cross-sectioned side elevation view of a counterbalancing mechanism employing a helical compression spring;

Figure 14 is a cross-sectioned side elevation view of a counterbalancing mechanism showing arrangements for adjusting the spring constant and spring tension;

Figure 15 is a side elevation view taken as on line 15—15 of Fig. 14;

Figures 16 and 17 are graphs of spring and load moments, respectively, exerted on the lever plotted against lever rotation; and Figures 18 and 19 are diagrammatic side elevation views of an arrangement like that of Fig. 11 showing the two extreme positions of the lever.

Referring now more particularly to the drawings, Fig. 7 illustrates the generation of the involute edge portion 10 of a lever 12. An involute of a circle is the curve traced by the end of a piece of string being unwrapped from the circle. In Fig. 7 a circle 14 with a center O and a radius *a* may be assumed to have a string wrapped around its circumference with its end at A. Unwrapping this string while maintaining the string taut causes the end A to trace a line $A—A_1—A_2—A_3—A_4$ which is an involute. The lever 12, adapted to be pivoted about the center O of circle 14, has a portion of its edge 10 formed to the curve $A_1—A_4$, and the remaining edge portions beyond the portion 10 are merely conveniently shaped.

The characteristic of the involute lever edge portion 10 which is useful in the present invention is that a line tangent to a point on this portion and extending in a particular direction is maintained at a perpendicular distance from the lever pivot O which varies linearly with changes in lever rotation about the pivot O. Thus, if a point $B_1$ on the circle 14 were vertically above the point O in Fig. 7 (by counterclockwise rotation of the lever 12 from the position shown), a line $C_1$ parallel to this vertical line $O—B_1$ and tangent to the involute lever edge portion 10 would engage this portion at point $A_1$ and the perpendicular distance from this tangent line to the pivot O would be the length of a line $S_1$. Then if the lever is rotated clockwise by an angle $\theta$ a second point $B_2$ is vertically above O, a vertical line $C_2$ tangent to edge portion 10 engages this portion at $A_2$, and the perpendicular distance has increased to $S_2$. Next if the lever is further rotated clockwise by the same angle $\theta$ a third point $B_3$ is vertically above O, a vertical line $C_3$ tangent to edge portion 10 engages the latter at $A_3$, and the perpendicular distance has increased to $S_3$. The increase in this perpendicular distance from $S_2$ to $S_3$ for a lever rotation of $\theta$ is equal to the increase from $S_1$ to $S_2$ for the same amount of lever rotation. Accordingly, this distance changes linearly with changes in lever rotation.

One aspect of the present invention is the discovery that the above-described characteristic of a lever with such an involute edge portion may be utilized to advantage in a spring counterbalancing device with that very common type of spring in which the force exerted by the spring varies linearly with changes in the spring deformation. The present invention enables the exertion of constant force along the line $(C_1, C_2, C_3)$ tangent to the lever involute edge portion 10 by securing to the lever a spring having such a rate of linear force variation.

Any elastic solid obeys the law expressed by the equation:

$$F = Kd \qquad (1)$$

where $d$ represents deformation of the solid, expressed, for example, in inches; F represents the force exerted by the solid resisting this deformation, expressed, for example, in pounds; and K is a constant, in this case expressed in pounds per inch. An example of an actual elastic body which illustrates this law would be an elongated cylindrical steel rod fixed at one end and having a weight secured to the other end so as to stretch the rod along its longitudinal axis. The elongation of the rod will change linearly with changes in the weight, or in other words if a 1000 pound weight stretched the rod ¼ of an inch, 2000 pounds would stretch the rod a total of ½ of an inch, 3000 pounds would provide a total stretch of ¾ of an inch, and so on, and K would equal 4000 pounds per inch.

Another form of deformation to which an elastic solid may be subjected is a twist about an axis. In such cases these solids obey a similar law expressed by the equation:

$$M = k\phi \qquad (2)$$

where $\phi$ represents the amount of total twist about the axis expressed in degrees; M represents the moment or torque exerted by the solid resisting this twisting deformation, expressed, for example, in inch-pounds; and $k$ is a constant, in this case expressed in inch-pounds per degree of rotation or twist. An example of an actual elastic body which illustrates this second law could again be an elongated cylindrical steel rod 16 as shown, for example in Fig. 8, having one end 18 secured against rotation to a fixed structure 20. Rotation of the other end 22 about the rod's longitudinal axis will be resisted by a moment or torque which varies linearly with the changes in rotation. Thus, if a ten degree twist of rod end 22 with respect to end 18 results in a resisting torque of 1000 inch-pounds, a twenty degree twist would result in a resisting torque of 2000 inch-pounds, a thirty degree twist would give 3000 inch-pounds, and so on, and $k$ would be 100 inch-pounds per degree.

A helical spring is an elastic solid arranged so that deformation along the axis of the helix both stretches (or compresses) and twists the solid. Both the stretch (or compression) and twist vary linearly with the amount of such axial deformation, however, and accordingly the resistance to deformation resulting from the combined resistances to stretch and twist will vary linearly with changes in the axial deformation.

A spiral spring is an elastic solid arranged so that deformation by winding the inner end of the solid about the spiral axis also both stretches (or compresses) and twists the solid. Here again, however, both the stretch and twist vary linearly with the amount of such winding, and hence the combined resistances to such winding vary linearly with changes therein.

Other types of useful elastic solids which resist deformation with forces that vary linearly with changes in such deformation and which are not specifically mentioned herein will occur to those skilled in the art, and it will be understood that they are comprehended in this invention.

Regardless of the particular elastic solid of the type described which is chosen in the present invention, it is to be secured to a frame and deformable by rotation of the lever relative to the frame so as to exert on such lever a moment which varies linearly with the amount of such lever rotation. Referring to Fig. 9, the rod 16 with its end 18 secured against rotation to the frame 20 has the lever 12 connected to its other end 22 by a key 24 located in a slot in the rod end 22. The lever 12 has an opening 26 through which the rod end 22 is adapted to pass and which causes the longitudinal axis 28 of the rod to pass through the center O of the circle 14 from which the lever involute is generated. The lever 12 is further provided in Fig. 9 with a slot 30 which extends radially from the opening 26 and accommodates a portion of the key 24 projecting from the surface of the rod. The slot 30 is shown substantially wider than the key 24 therein, and, accordingly, projections 32 extend into the slot 30 to engage the key at a distance $e$ from the axis 28. The projections alone serve to prevent rotation of the lever with respect to the rod end 22.

In Fig. 9 the rod end 22 is shown twisted approximately 113° with respect to the fixed end 18 by a load 34 suspended vertically from the lever 12 by a flexible member 36. This flexible member has its upper end secured to the lever at 38 and extends vertically downward from the involute lever edge portion 10 tangent thereto at $A_3$. Thus, the weight L of load 34 produces a turning moment (clockwise as seen in Fig. 9) which is equal to this weight times a distance $S_3$ which is the perpendicular distance from the vertical line of action of the load to the rod axis 28. This load turning moment is resisted by the moment exerted in the opposite direction by the twisted rod. In accordance with Equation 2 this spring moment equals the spring constant $k$ times the 113° of twist.

The securing of the lever 12 to the rod end 22 in Fig. 9 with the twistnig force of the spring exerted on the rod end 22 at a distance $e$ from the rod axis 28 is offered in an attempt to facilitate understanding that the spring moment or torque M of Equation 2 may be considered as the result of a force exerted at the end of an unchanging moment arm which is in this case $e$. Torques and moments are frequently computed as the product of a force acting at the end of such a single moment arm, and where there is no easily identifiable single moment arm, as where the rod 16 and lever 12 is an integral piece, difficulty in visualizing the existence of a moment might result. From Equation 2, however, it will be noted that it is unnecessary to determine a moment arm such as $e$ for a solution, and this will be understood when it is considered that regardless of the location of the projections 32 toward or away from the rod axis 28 in Fig. 9 the spring moment produced by a given rotation of the lever (for example 113°) would remain the same.

Perfect constant support results in the arrangement of Fig. 9 when the load moment equals the spring moment, a condition which may be expressed by the formula:

$$LS=k\phi \qquad (3)$$

where the angle $\phi$ is the amount the rod is twisted from its undeformed condition. As will be seen from Fig. 7, however, S is equal to the distance along the involute base circle circumference from the beginning of the involute A to the point on such circle which is intersected by a line from the circle center O parallel to the line of action of the load and extending in a direction opposite to the direction of the load force. In Fig. 7 this point is $B_3$, and the distance $S_3$ may be expressed:

$$S_3=\frac{\alpha}{360°}2\pi a \qquad (4)$$

If $\alpha$ is in any case the angle between O—A and the line extending from O parallel to the line of action of the load but in the direction opposite to the load force, then the more general equation may be written:

$$S=\frac{\alpha}{360}2\pi a \qquad (5)$$

and Equation 3 becomes:

$$L=\frac{360°k\phi}{2\pi a\alpha} \qquad (6)$$

By causing the line O—A on the lever to be parallel to the line of action of the load with A extending from O in the direction opposite to the direction of the load force when the spring is just relaxed, angles $\alpha$ and $\phi$ will be zero in this position and will be equal to each other in each rotational position of the lever. Accordingly, with this condition satisfied ($\alpha=\phi$), Equation 6 for any position of the lever from the load supporting flexible member tangent at $A_1$ to the load supporting member tangent at $A_4$ may be written:

$$L=\frac{360°k}{2\pi a} \qquad (7)$$

Since all of the terms in this Equation 7 are constant, perfect constant support of any given load may be achieved. Assume, for example that the load to be supported weighs 1000 pounds, and $a$ is five inches. Solving for $k$ it is found that a spring must be selected having a $k$ of 87.26 inch-pounds per degree. Similarly, assume that the load to be supported is 1000 pounds and a spring has already been selected having a constant of 314.16 inch-pounds per degree. Solving for $a$, the radius of the involute base circle, it is found that this radius shall be 18 inches.

Figure 10 is another view showing the manner in which the lever 12 is secured to the rod 16 in Figure 9.

Figure 11 is a view showing a helical tension spring 40 employed as the elastic solid means deformed by the rotation of the lever 12 and supporting a load 42 by the moment this spring exerts on the lever in resisting this deformation. Typically this load 42 is a section of a horizontal run of pipe in a piping system and is subject to vertical movement within a limited range due to changes in temperature of the fluid carried by the system. The function of the counterbalance mechanism of Fig. 11 is to exert an upward supporting force on the load 42 which remains constant during vertical movement of this load within its limited range.

The mechanism has a frame 44 with two depending side plates 46 and a top wall 48 extending therebetween to which a supporting rod 50 is threaded. The upper end (not shown) of this rod 50 is adapted to be secured to some fixed structure such as a building frame. A pin 52 extends between the side plates 46 with its axis O substantially horizontal and its ends journalled in these plates. Pivotally mounted on this pin are the lever 12 and a pulley 56 secured to each other by bolts 58. A flexible member such as a steel cable 60 has its upper end secured to the lever by the bolt 62 and has its lower end secured to the pipe section 42. The rod 50 has its upper end secured to a fixed structure at such a location with respect to the pipe section 42 that the cable 60 extends substantially vertically downward for its connection with the pipe section. This vertical cable portion is tangent to the involute lever edge portion 10 at point $A_3$ between the ends $A_1$ and $A_4$ of this edge portion, and between the point $A_3$ and $A_4$ the cable 60 is wrapped against the edge portion 10.

The helical tension spring 40 is provided at its ends with plugs 64 and 66, the latter being secured to a frame wall 68 extending between the side plates 46 by a bolt 70 disposed axially with respect to the spring and provided with a nut 72 whereby the position of the plug 66 with respect to the frame may be changed axially of the spring. The plug 64 is provided with an eyebolt 74 to which one end of a second cable 76 is secured. This second cable extends to the pulley 56 and is wrapped therearound to a bolt 78 which connects the other cable end to the pulley. As shown in this Fig. 11, the weight of the load 42 tends to rotate the lever and pulley assembly in a clockwise direction to wrap the cable 76 on the pulley 56 and elongate the spring 40. The spring tends to oppose this rotation sought to be effected by the load.

Unlike the rod 16 in Fig. 9 which is rotationally deformed and exerts directly on the lever 12 a moment or torque expressed as $k\phi$, the spring 40 in Fig. 11 is adapted for axial deformation and exerts along its axis a force expressed as K$d$ (see Equation 1 above). The cable 76 is employed to convert this axial force into a moment, and with a radius $r$ for the circular pulley 56, this moment is expressed as K$dr$.

It will be seen that there is a relationship between the pulley radius $r$ and the axial deflection $d$. Spring deforming rotation of the pulley $\beta$ degrees from a position where the spring is just relaxed will make $d$ equal to an amount expressed as $$\frac{\beta}{360°}2\pi r$$

so that the spring moment may be defined as $$\frac{K\beta 2\pi r^2}{360°}$$

In this Fig. 11 arrangement, the expression for the load moment is again $$L\frac{\alpha 2\pi a}{360°}$$

and, hence the Fig. 11 moment equation may be written:

$$L\frac{\alpha 2\pi a}{360°}=K\frac{\beta 2\pi r^2}{360°} \quad (8)$$

or $$L\alpha a=K\beta r^2 \quad (9)$$

But angles $\alpha$ and $\beta$ may be made equal for any position of the lever-pulley assembly by having the spring 40 just relaxed when line O—A is parallel to the line of action of the weight of the pipe section 42 (with A extending from O in the direction opposite to the direction in which the weight is acting). When this condition is satisfied ($\alpha=\beta$), Equation 9 becomes:

$$L=\frac{Kr^2}{a} \quad (10)$$

and for any value of load L proper values for K, $r$ and $a$ may be selected to make the expression $$\frac{Kr^2}{a} \text{ equal to } L$$

In Fig. 11, the positions of the outer face of plug 64 and the corresponding positions of line O—A on the lever are indicated for the conditions of spring relaxation, of cable 60 tangent to one of the involute edge portion ends $A_1$ and of cable 60 tangent to the other involute edge portion end $A_4$. Since line O—A must be vertical when spring 40 is just relaxed, line O—$A_1$ will be coincident with position $F_0$ and the plug face will be adjacent position $E_0$. Rotation of the lever-pulley assembly until cable 60 is tangent to the involute at $A_1$ will locate line O—$A_1$ at position $F_1$ and plug 64 at position $E_1$. Rotation of the lever-pulley assembly until cable 60 is tangent to the involute at $A_4$ will locate line O—$A_1$ at position $F_4$ and the plug at position $E_4$.

I the spring moment expression $K\beta r^2$ of Equation 9 the only variable is the angle $\beta$ through which the lever-pulley assembly of Fig. 11 rotates, and accordingly in Fig. 16 where these spring moments are plotted against $\beta$ the resulting curve is linear as shown. The lines $F_0$, $F_1$ and $F_4$ in Fig. 16 illustrate that the spring 40 in Fig. 11 is just relaxed ($\beta=0°$) when line O—$A_1$ is at position $F_0$, that $\beta$ is approximately 50° when line O—$A_1$ is at position $F_0$, that $\beta$ is approximately 50° when line O—$A_1$ is at position $F_1$ (beginning of the working range of device as indicated by shading) and that $\beta$ is approximately 147° when line O—$A_1$ is at position $F_4$ (end of working range).

Similarly in the load moment expressin $L\alpha a$ of Equation 9 the only variable is the angle $\alpha$ through which the lever-pulley assembly rotates, and hence in Fig. 17 the plot of these load moments against angle $\alpha$ gives a straight line curve over that portion of the rotation (shaded area) where the cable 60 is tangent to the lever edge portion 10.

It will be seen from Equations 7 and 10 that the constants $k$, $a$, K and $r$ can be selected so that $$\frac{360°k}{2\pi a} \text{ or } \frac{Kr^2}{a}$$

equal the particular load L to be supported. It is desirable, however, to provide the mechanism so that it will accommodate a variety of loads within a load range. This could be accomplished by making one or more of these constants adjustable. As a practical matter adjustment of $a$ and $r$ would be quite elaborate in the devices shown, though it is within the scope of the invention to utilize mechanism which would allow for such changes. However, changes in $k$ and K are quite easily made, as illustrated in the drawings. In Fig. 11 relocation of one or both plugs 64 and 66 in the spring 40 to change the number of active spring coils will change K. Increasing the number of active coils will decrease K, and decreasing the number of active coils will increase K. In Fig. 11 after K has been thus changed to accommodate a different load, the bolt 74, adjustable in plug 64, may be turned to relocate this bolt with respect to this plug so that the spring 40 will be just relaxed when line O—A extends vertically upward. Similarly, in Fig. 11 after K has been changed to accommodate a different load, the nut 72 may be turned to relocate the bolt 70 with respect to the frame 68 until spring 40 is just relaxed when line O—A extends vertically upward; or both bolt 74 and nut 72 may be adjusted. Determination as to when line O—A is thus vertical is simplified by providing an indication U at point A on lever 12 and by providing a mark W on the frame with which mark U should line up when spring 40 is just relaxed.

The curves $Gs_1$ and $Gl_1$ in the graphs of Figs. 16 and 17, respectively, illustrate the increase in moments which results from a higher K (Fig. 16) to take care of a larger L (Fig. 17). The curves $Gs_2$ and $Gl_2$ illustrate the smaller moments which result from a lower K value (Fig. 16) employed with a smaller L than was employed to obtain curve $Gl$.

Referring now to Fig. 12, there is shown here a constant support mechanism which avoids the problem sometimes referred to in the art as "angularity." Figs. 18 and 19 serve to illustrate this problem. These latter figures show the lever 12 of a typical arrangement in its two extreme positions. It will be seen that for the load supporting flexible member to remain vertical at 80 as required for ideal operation in the support of a load acting vertically downward this vertical flexible member portion 80 must move laterally. In some cases, however, the load is not able to thus move laterally and the vertical flexible member portion 80 may take positions designated 82. To the extent that position 82 departs from the vertical an error in the constancy of support is present. This can be minimized by having the flexible member quite long, but it can be completely removed by the arrangement of Fig. 12.

The device in Fig. 12 employs two similar involute levers 84 and 86, each with its pulley 88 and 90, respectively, and its cable 92 and 94 connected around an additional pulley 96 and 98 to the end plug 100 of a spring 102. The other end plug 104 of this spring is secured to the frame 106. The lever 84 is in the same position as the lever 12 in Fig. 11 and has a flexible cable 108 connecting it to the load 110. The other lever 86, however, is inverted and positioned so that a cable 112 connecting it to a fixed structure 114 is tangent to lever 86 at a point on the involute portion thereof corresponding to the point on the involute portion of lever 84 to which cable 108 is tangent. In this arrangement the portions of cables 108 and 112 between the levers and the load and fixed structure, respectively, remain vertical and in alignment as the load moves vertically, and the frame 106 moves laterally.

Referring now to Fig. 13, this shows the employment of a helical compression spring 116 in place of the tension spring 40 of Fig. 11, and further shows how the lever 12 may be angularly adjusted with respect to pulley 56 in the lever-pulley assembly to cause line O—A to be vertical when the spring 116 is just relaxed. One end of the spring 116 is abutted against the frame 118 which has a spring retaining cylinder 120 secured thereto and extending part way into the spring end. The other end of the spring has a cap member 122 thereacross with a similar spring retaining cylinder 124. Telescoping hollow guides 126 and 128 secured to the frame and cap, respectively, prevent the spring from buckling. The flexible member 130 associated with the pulley 56 passes through the hollow guides and is secured to the cap 122.

In Fig. 13 the lever 12 has in an edge portion 132 a recess 134 with side walls 136 which provide journals for a pin 138. A threaded eyebolt 140 encircles this pin with sufficient clearance in the recess to permit free pivoting on the pin to the extent required. A block 142 is provided with an opening through which the eyebolt shank is loosely passed. A nut 144 is threaded on this shank to engage the side of the block opposite the pin 138. The block is provided with a trunnion 146 journalling the block to the pulley. By this arrangement, slight rotational adjustments of the lever with respect to the pulley may be made by turning the nut 144 along the eyebolt shank and changing the distance between the axis of the pin 138 and the axis of the trunnion 146. Thus, if the line O—A is not extending exactly vertically upward (parallel to the line of action of the load) when the spring is just relaxed, it may be made to do so by this adjustment of nut 144.

Referring to Fig. 1, there is here shown a device according to the present invention employing a pair of spiral springs 148. The inner end of each such spring is bent to pass substantially through the axis of the spiral and is engaged in a slot 150 in the threaded end of a pin 152 journalled in a pair of spaced side plates 154 and 156 of the frame 158. A nut 160 is threaded on each end of the pin 152 to retain the engagement of the spring in the slot 150. Washers 162 and 164 are interposed between the nut 160 and spring and between the spring and the side plate, respectively.

Near its outer end each spring passes through a closed slot 166 in a pin 168 extending outward from the frame side plate. This pin 168 is flattened as at 170 so as to pass through the spaces in the spiral (see Fig. 4), and at its other end, which passes through the frame side plate, is threaded to receive a nut 172. Two washers 174 and 176 are located on the pin 168 between the spring and frame side plate. The washer 176 is of the ordinary kind with flat parallel sides as shown in Fig. *4a*. However, the washer 174 is provided on the side adjacent the spring with raised guides 178 having upstanding flange portions 180 between which the spring stock passes and having a floor portion 182 raised above the remainder washer surface 184 so that adjacent spirals will not rub against this washer. Tightening nut 172 clamps the spring portion in the slot 166 firmly between the end **166*a* of the slot and the floor portions 184 of the washer guides 178**.

The involute lever 186 is secured to pin 152 between the frame side plates by a set screw 188 and has lever side plates 190 welded to it as at 200. These lever side plates extend beyond the edge surface of the lever 186 and serve to retain a cable 202 on the involute lever edge as the lever rotates. Projections 204 integral with the lever side plates 190 are adapted to engage a stop pin 206 between the frame side plates when the lever has rotated clockwise to the limit of desired movement. This stop arrangement is desirable in the event the spring should break.

A block 208 is secured across the edges of the lever side plates 190 opposite a lever edge portion beyond the upper end of the involute. The upper end of a flexible cable 202 is folded over a loose block 212 positioned between the lever edge and the block 208, and a second loose block 214 is interposed between the folded portion of the cable end and block 208. A set screw 216 in block 208 presses block 214 down toward lever 186 and clamps the cable fixedly in place. The lower end of cable 202 is secured in some suitable fashion to the suspended load, which in Fig. 1 is a pipe section 218, as for example by an eye 220 at the lower cable end engaging a bracket 222 welded to the pipe section.

The lever and lever side plate assembly is centered between the frame side plates 154 and 156 by spacers 224 and 226 (see Fig. 2), so that the lever assembly passes freely between the nuts 172.

An arcuate slot 228 is provided in each of the frame side plates to accommodate the pin 168 and permit arcuate adjustment of the position of this pin on the frame around the axis of the pin 152. The purpose of this slot is to enable changes in the spring constant to allow for slight changes in load. Thus in installing this device the clamping of the spring in the slot 166 is released by loosening nut 172. Next, the lever is rotated (counterclockwise in Fig. 1) until the line from the center of the involute circle to the beginning of the involute on said circle extends parallel to the line of action of the load, with the beginning of the involute extending from the involute circle center in a direction opposite to the direction of the load force. During this rotation of the lever a portion of the spring will have passed through the slot 166 if the device had not been previously properly set. Then the nut 172 is tightened, gripping the spring and fixing it with respect to the frame. The device is then ready for operation. If upon operation it is found that the spring is not exerting enough force, this can be corrected by increasing the spring constant. This is done by rotating the lever back to the condition of spring relaxation, loosening nut 172 and advancing the pin 168 along the slot 228 (to the right in Fig. 1) to a new location and, with the spring still relaxed and with line O—A extending in the proper direction, retightening the nut 172. During this movement of pin 168 along slot 228, the spring slides freely in pin slot 166. This adjustment increases the spring constant because it decreases the effective portion of the spring between the connected ends thereof.

In the arrangement of Fig. 1 the frame 158 has a top wall member 230 to which a rod 232 is secured. The upper end of this rod (not shown) is adapted to be secured to some fixed structure such as a building frame.

The arrangement of Figs. 14 and 15 illustrates that with a spiral spring 234, the adjusting means for changing the spring constant and for making the spring become relaxed in the proper position of the lever with each spring constant selected may be located on the lever. Pivoted on the pin 236 on which the lever 238 rotates and adjacent one side of the lever is an arm 240 having at its end 242 two spaced integral bars 244 and 246 between which the inner spring end is adapted to lie. A bolt 248 in the bar 246 is adapted to clamp this spring end against the bar 244 and thereby fix the spring to the arm 240. The arm in turn has a bolt 250 therein which passes through an arcuate slot 252 in the lever 238 and is provided with a nut 254. The position of the arm with respect to the lever may be changed by loosening bolt 250, moving the arm to another location on the side of the lever and retightening the bolt.

In accommodating the device of Figs. 14 and 15 to a particular load, the bolt 248 is first loosened so that the spring can pass freely between bars 244 and 246. Then the lever 238 is rotated (counterclockwise in Fig. 17) until the line from the axis of pin 236 to the beginning of the involute on the involute circle is vertical. Next the bolt 248 is retightened on the spring at the part thereof between the bars 244 and 246 when the lever is in the position described. The spring is relaxed. Next the load is secured to the device. If the load is found to be too heavy for the spring, the spring constant may be increased. This is done by following the above steps except that before bolt 248 is tightened, bolt 250 is loosened, arm 240 moved counterclockwise (in Fig. 14) and bolt 250 retightened. This decreases the effective length of the spring between the points to which it is secured to frame and lever and therefore increases the spring constant. The slot 252 may have a scale associated therewith calibrated to indicate the loads which will be supported for various positions of the arm 240 along the slot. The spring constant is, of course, decreased by moving arm 240 clockwise (in Fig. 14) in slot 252.

I claim:

1. A mechanism for exerting on a body a constant force in a predetermined direction, said mechanism comprising a frame, a lever pivoted to the frame for rotation about the pivot axis, said lever having a portion following the curve of an involute of a circle centered at said lever pivot, a spring having a linear force-deformation characteristic, one spring portion being connected to the frame, a force transmitting means for connecting a second spring portion which is spaced from the first portion with said lever, said spring being deformable by rotation of the lever to move said second portion along a straight path and exerting along said path a force which opposes and is substantially directly proportional to the amount of said deformation, and force transmitting means for connecting said lever with said body and extending therebetween substantially in one direction for all rotative positions of the lever, said involute lever portion maintaining said last mentioned force transmitting means at a distance from said lever pivot axis which varies substantially linearly with changes in lever rotation, and said spring deformation just beginning at that rotative position of the lever where the origin of the involute on the involute circle lies on a line extending in said direction from the involute circle center.

2. A hanger as set forth in claim 1 further comprising means for connecting said second spring portion to the lever, said connecting means being fixed to the lever and engaging said spring, and means for adjusting said connecting means along said spring for said engagement at selected spring portions on either side of said second portion, whereby the force-deformation characteristic of the spring may be changed.

3. A hanger as defined in claim 1 further comprising means for connecting said one spring portion to the frame, said connecting means being fixed to the frame and engaging said spring, and means for adjusting said connecting means with respect to said spring for engagement at selected spring portions on either side of said one portion, whereby the force-deformation characteristic of the spring may be changed.

4. A hanger as defined in claim 1 further comprising means for connecting said one spring portion to the frame, said connecting means being fixed to said one portion and engaging said frame, and means for adjusting said connecting means with respect to said frame, whereby for a given rotative position of the lever in which said spring is deformed the amount of said deformation may be changed.

5. A hanger as defined in claim 1 further comprising means for connecting said one spring portion to the frame, said connecting means being fixed to said one portion and to said frame, and means for moving said one portion relative to said frame along said connecting means, whereby for a given rotative position of the lever in which said spring is deformed the amount of said deformation may be changed.

6. A hanger for exerting on a load movable vertically within a limited range a vertical supporting force equal to the weight of the load throughout said limited range, said hanger comprising a frame, a lever, means pivoting the lever to the frame for rotation of the lever about an axis, a spring having one portion secured to the frame, a force transmitting means for connecting a second portion of said spring to the lever, said spring being deformable by rotation of the lever to move said second portion along a straight path and exerting along said path a force which opposes said movement and is substantially directly proportional to the amount thereof, flexible force transmitting means connected to said lever and having a portion adapted to extend therefrom in one direction for connection with the load, said lever having an edge portion which follows the curve of an involute of a circle centered at the lever pivot axis and which engages the flexible force transmitting means between the lever and load connections and maintains the extending portion at a distance from said horizontal pivot axis which varies linearly with changes in lever rotation, said spring deformation just beginning at that rotative position of the lever where the origin of the involute on the involute circle lies on a straight line extending from the involute circle center in a direction opposite said one direction, and means for mounting said frame with said pivot axis substantially horizontal and said extending flexible means substantially vertical.

7. A spring hanger for exerting on a load movable vertically within a limited range a vertical supporting force equal to the weight of the load throughout said limited range, said hanger comprising a frame, a lever, means pivoting the lever to the frame for rotation of the lever about an axis, a spring connected at one end to the frame, force transmitting means for connecting the other end of said spring to said lever, said spring being deformable by rotation of the lever to move the connection at said other spring end along a straight path and exerting along said path a force which opposes said movement and varies linearly therewith, flexible force transmitting means connected near one end to said lever and adapted to be connected near the other end to said load, said path being at a constant first perpendicular distance from said horizontal pivot axis, said lever having an edge portion which follows the curve of a portion of the involute of a circle centered at said pivot axis and engages part of the flexible force transmitting means near said one end thereof, said flexible force transmitting means having its unengaged part extending in one direction toward the involute lever edge portion substantially tangentially therewith at a second perpendicular distance from the horizontal pivot axis which varies linearly with changes in lever rotation, said spring deformation just beginning at that rotative position of the lever where the origin of the involute on the involute circle lies on a radius of said circle extending in said one direction, and means for mounting said frame with said pivot axis substantially horizontal and said unengaged flexible means part substantially vertical.

8. A hanger as set forth in claim 7 in which said spring is a tension spring.

9. A hanger as set forth in claim 7 in which said spring is a compression spring.

10. A spring hanger for exerting on fluid handling equipment a vertical force which opposes the weight of said equipment and the contents thereof and which is substantially equal to said weight throughout a limited range of vertical movement of the equipment caused by changes in temperature of the fluid, said support comprising a frame, a lever pivoted on the frame for rotation of the lever about an axis, said lever having side portions and a curved edge portion extending between said side portions and spaced from said pivot axis, spring means for connecting a first portion of said spring to the frame, additional means for connecting a second portion of said spring to the lever, said spring between the said portions thereof being deformable by rotation of the lever to move said second spring portion along a straight path and exerting along said path a force which opposes said movement and varies linearly with the amount thereof, a flexible force transmitting member having one end connected to said lever and having a first portion adjacent said connected end adapted to lie against the curved lever edge portion, means for mounting said frame with said pivot axis horizontal, said flexible force transmitting member having an additional portion unengaged by said lever edge and extending substantially tangentially therefrom vertically downward for connection with the fluid handling equipment when said frame is mounted, said path always being at a constant distance from said lever pivot axis whereby the turning moment exerted by said spring on the lever about the lever pivot increases linearly with changes in lever rotation in one direction in accordance with the linear variation in spring force for said changes in lever rotation, said additional force transmitting member portion remaining substantially vertical for each rotative position of said lever when the frame is mounted, said curved lever edge portion being a section of the involute of a circle centered at said lever pivot whereby the turning moment exerted by the weight of said equipment on the lever about the lever pivot also increases linearly with changes in lever rotation in said one direction, and said spring deformation just beginning at that rotative position of the lever where the origin of the involute on the involute circle lies vertically above the lever pivot axis when the frame is mounted.

11. A hanger for exerting on a load movable vertically within a limited range a vertical supporting force equal to the weight of the load throughout said limited range, said hanger comprising a frame, a lever, means pivoting the lever to the frame for rotation of the lever about an axis, a spiral spring having a first portion near the outer end thereof secured to the frame at a fixed distance from the pivot axis and having a second portion near the inner end thereof secured to the lever at a lesser fixed distance from the pivot axis, said spiral spring being deformable by rotation of the lever to move said second portion along a circular path having a radius equal to said lesser fixed distance, and said spiral spring exerting along said path a force which opposes the said movement of said second spring portion and which varies linearly with the amount of said movement, and a flexible force transmitting member connected to said lever at a fixed distance from the lever pivot axis and extending from said connection in engagement with a curved edge of the lever and thence out of engagement with said edge in one direction toward said load for connection therewith, said lever edge curve being an involute of a circle centered at said lever pivot whereby the perpendicular distance from the unengaged portion of the flexible force transmitting member to the lever pivot axis varies linearly with changes in lever rotation, said spiral spring deformation just beginning at that rotative position of the lever where the origin of the involute on the involute circle lies on a straight line extending from the involute circle center in a direction opposite said one direction, and means for mounting said frame above said load with said lever pivot axis horizontal and said unengaged flexible force transmitting means substantially vertical.

12. A hanger as defined in claim 11 further comprising means for connecting said second spring portion to the lever, said connecting means being fixed to said second spring portion and engaging said lever, and means for adjusting said connecting means on said lever for accomplishing said engagement at selected points on said lever, whereby for a given rotative position of the lever in which said spring is deformed the amount of said deformation may be changed.

13. A hanger for exerting on a load movable vertically within a limited range a vertical supporting force equal to the weight of the load throughout said limited range, said hanger comprising a frame, a shaft pivoted to the frame for rotation about an axis and having an axial slot therein, a lever secured to the shaft to rotate in unison therewith about said axis, said lever having an edge portion which is spaced from said axis and which follows the curve of an involute generated from a circle centered at said axis, a spiral spring having a first portion near the outer end thereof secured to the frame at a fixed distance from the pivot axis and having a second portion near the inner end thereof engaged in said shaft slot, said spiral spring being deformable by rotation of the lever to move said second spring portion along a circular path which remains at constant distance from said axis for all rotative positions of the lever, said spiral spring exerting on the shaft along said path a force which opposes the said movement of said second spring portion and which varies linearly with changes in lever rotation, and a flexible tension-force transmitting member connected near one end to said lever and adapted for connection near the other end to the load, said force transmitting member having a portion adjacent the connection to the lever which is engaged by and lies against said lever edge portion and having its remainder between the connections extending in one direction toward the load tangentially from the involute curved lever edge portion, said spiral spring deformation just beginning at that rotative position of the shaft and lever where the origin of the involute on the involute circle lies on a straight line extending from the involute circle center in a direction opposite said one direction, and means for mounting the frame with said shaft axis substantially horizontal and said force transmitting means remainder substantially vertical.

14. A hanger for exerting on a load movable vertically within a limited range a vertical supporting force equal to the weight of the load throughout said limited range, said hanger comprising a frame having spaced parallel side wall members and a top wall member connecting said side wall members, a shaft extending between said side wall members substantially perpendicular thereto and journalled therein, the ends of said shaft projecting beyond said side wall members and having axial slots formed therein, a spiral spring on the outside of each side wall member having a portion near the inner spring end engaged in the shaft slot and having a portion near the outer spring end secured to the side wall member, a lever secured to the shaft between said side wall members for limited rotation in unison with the shaft about the shaft axis, said lever having an edge portion which follows the curve of an involute generated from a circle centered at the shaft axis, said involute edge portion having retaining lips at the sides thereof extending outward therefrom radially with respect to the shaft axis, a flexible elongated tension-force transmitting member connected near one end thereof to said lever and adapted to be connected near the other end to said load, said force transmitting member between said connections having one portion engaged by said involute lever edge portion and retained thereon by said lips and having its remainder extending in one direction to said load, means for mounting said frame with said shaft axis substantially horizontal and said remainder of said force transmitting member disposed substantially vertical, said lever being rotated about the shaft axis by the force exerted by the load, said spiral spring being deformed by said rotation, and said spiral spring deformation just beginning at that rotative position of the lever where the origin of the involute on the involute circle lies on a radius of said circle which extends in the direction opposite said one direction.

15. A hanger for exertng on a load movable vertically within a limited range a vertical supporting force equal to the weight of tne load throughout said limited range, said hanger comprising a frame, a lever pivoted to the frame for rotation about an axis, said lever having a first edge portion which is spaced from said axis and which follows the curve of a circle centered at said axis, a helical spring having a first portion near one end thereof secured to the frame and having a second portion near the other end thereof, a flexible force transmitting member connected to said second spring portion and to said lever, said force transmitting member being engaged between said connections by said first lever edge portion and having a part extending tangentially therefrom toward said spring, said helical spring being deformable by rotation of the lever to move said second spring portion and exerting a force on said lever through said force transmitting member which opposes said rotation and varies linearly with changes in lever rotation, said lever having a second edge portion which is spaced from said axis and follows the curve of an involute generated from a circle centered at said axis, an additional flexible force transmitting member connected to said lever and adapted for connection to said load, said additional force transmitting memer being engaged between said connections by said second lever edge portion and having a part extending tangentially therefrom in one direction toward the load, means for mounting said frame with said axis substantially horizontal and said second flexible force transmitting means part substantially vertical, and said spring deformation just beginning at that rotative position of the lever where the origin of the involute on the involute circle lies on a radius of said circle which extends in the direction opposite said one direction.

16. A hanger for exerting on a load movable vertically within a limited range a vertical supporting force equal to the weight of the load throughout said limited range, said hanger comprising a frame, a first lever pivoted to the frame for rotation about a first axis, a second lever pivoted to the frame for rotation about a second axis parallel to said first axis, each of said levers having an edge portion which follows the curve of an involute generated from a circle centered at the lever axis, means for connecting each lever to a spring, said spring having a first portion near one end thereof secured to the frame and having a second portion near the other end thereof connected to said levers, said spring being deformable by rotation of each lever to move said second spring portion along a straight path which is at a constant perpendicular distance from the lever axes, and said spring for each lever exerting along said path a force which opposes and varies linearly with the changes in the lever rotation which produces said deformation, a flexible force transmitting member connected to the first lever and adapted for connection with a fixed structure vertically above the load, said force transmitting member being engaged between said connections by the involute edge portion of the first lever and having a part extending tangentially therefrom substantially vertically upward toward said fixed structure when actually connected thereto, an additional flexible force transmitting member connected to the second lever and adapted for connection with the load, said additional force transmitting member being engaged between said connections by the involute edge portion of the second lever and having a part extending tangentially therefrom substantially vertically downward toward said load when actually connected thereto, said first and second levers rotating substantially equally and in opposite directions upon movement of the load, said springs opposing rotation of both levers caused by the weight of load, said vertical parts of said force transmitting members being in alignment for one position of the load, said involute lever edge portions being substantially identical and one of said levers being inverted with respect to the other whereby said vertical force transmitting member parts remain in alignment during vertical movement of the load, and the deformation of the springs for each lever just beginning at that rotative position of the said lever where the origin of the involute on the involute circle lies on a radius of said circle which extends in the direction opposite to the direction in which the vertical force transmitting member part extends from said lever.

17. A mechanism for exerting on a body a non-varying force in a predetermined direction, said mechanism comprising a frame, a member rotatable on a pivot on the frame, a spring interposed between the frame and the member and exerting on the member a force which varies linearly with lever rotation, a flexible element secured to the body and to the member and having a portion extending therebetween, said member having an edge surface which follows the curve of an involute of a circle centered at said pivot and which engages said flexible element portion, whereby the linearly varying force exerted by the spring on the member is converted into a non-varying force exerted by the member on the body.

References Cited in the file of this patent

UNITED STATES PATENTS

| | | |
|---|---|---|
| 1,769,964 | Reid | July 8, 1930 |
| 1,816,164 | Wood | July 28, 1931 |
| 2,129,320 | Geairns | Sept. 6, 1938 |
| 2,398,211 | Du Pont | Apr. 9, 1946 |

FOREIGN PATENTS

| | | |
|---|---|---|
| 254,943 | Great Britain | July 15, 1926 |
| 474,008 | Great Britain | Oct. 25, 1937 |
| 620,121 | Germany | Oct. 14, 1935 |